US012738746B2

(12) United States Patent
Klementowski

(10) Patent No.: US 12,738,746 B2
(45) Date of Patent: Sep. 15, 2026

(54) SOLAR PANEL CHARGING BLOCK AND LOAD OUTLETS

(71) Applicant: Lynn Klementowski, Cuyahoga Falls, OH (US)

(72) Inventor: Lynn Klementowski, Cuyahoga Falls, OH (US)

( * ) Notice: Subject to any disclaimer, the term of this patent is extended or adjusted under 35 U.S.C. 154(b) by 565 days.

(21) Appl. No.: 18/377,374

(22) Filed: Oct. 6, 2023

(65) Prior Publication Data

US 2025/0118988 A1 Apr. 10, 2025

(51) Int. Cl.
*H02J 7/35* (2006.01)
*F21S 9/03* (2006.01)
*H02S 40/38* (2014.01)

(52) U.S. Cl.
CPC .................. *H02J 7/35* (2013.01); *F21S 9/03* (2013.01); *H02S 40/38* (2014.12)

(58) Field of Classification Search
CPC ........ H02J 7/35; H02J 7/00; H02J 7/02; H02J 7/35; H02J 7/865; H02S 40/38; F21S 9/03
USPC ................................ 320/101, 107, 114, 128
See application file for complete search history.

(56) References Cited

U.S. PATENT DOCUMENTS

2005/0057214 A1* 3/2005 Matan ...................... H02J 7/35 320/101
2010/0013309 A1* 1/2010 Rosenblatt ................ H02J 7/35 307/64
2012/0043923 A1* 2/2012 Ikriannikov .............. H02J 1/10 307/82
2012/0274265 A1* 11/2012 An ........................... H02J 7/00 320/101
2022/0166089 A1* 5/2022 Wagoner ............. H01M 10/482

FOREIGN PATENT DOCUMENTS

CN 116323290 A * 6/2023 ............... H02J 7/54

* cited by examiner

*Primary Examiner* — Edwyn Labaze
(74) *Attorney, Agent, or Firm* — Lumen Moulton, Esq.; Moulton Patents, PLLC

(57) ABSTRACT

A Solar Panel Assembly comprising a charge pump configured to boost a solar cell voltage to an intermediate voltage, a transformer configured to transform an alternating current voltage to the intermediate voltage, a battery configured to take a charge at the intermediate voltage from the charge pump and the transformer simultaneously, and a transparent housing for the charge pump, the transformer and the battery.

16 Claims, 3 Drawing Sheets

SOLAR PANEL CHARGING BLOCK AND LOAD OUTLETS

BACKGROUND

There are a wide variety of problems commonly associated with solar lights, including lights that only work for an hour due to insufficient sun exposure. Moreover, individuals will often have to replace solar lights every year because they weren't properly charged, making the maintenance inconvenient and costly in overtime money and time. There have been no products available as original equipment or as an aftermarket to address this problem.

An apparatus that can adequately harness solar power sufficiently to have your lights properly charged and last on that charge for a longer period of time, is not being met by any known device or system at present. There have been no products available as original equipment or as an aftermarket to address this problem either.

SUMMARY OF THE INVENTION

The main purpose the Solar Panel Charging Block and Light Assembly is to provide users with an advanced system for outdoor solar lights that allows users to unplug a solar charging unit from an associated set of string lights or other electric loads.

A Solar Panel Assembly comprising a charge pump configured to boost a solar cell voltage to an intermediate voltage, a transformer configured to transform an alternating current voltage to the intermediate voltage, a battery configured to take a charge at the intermediate voltage from the charge pump and the transformer simultaneously, and a transparent housing for the charge pump, the transformer and the battery.

Figure 1:
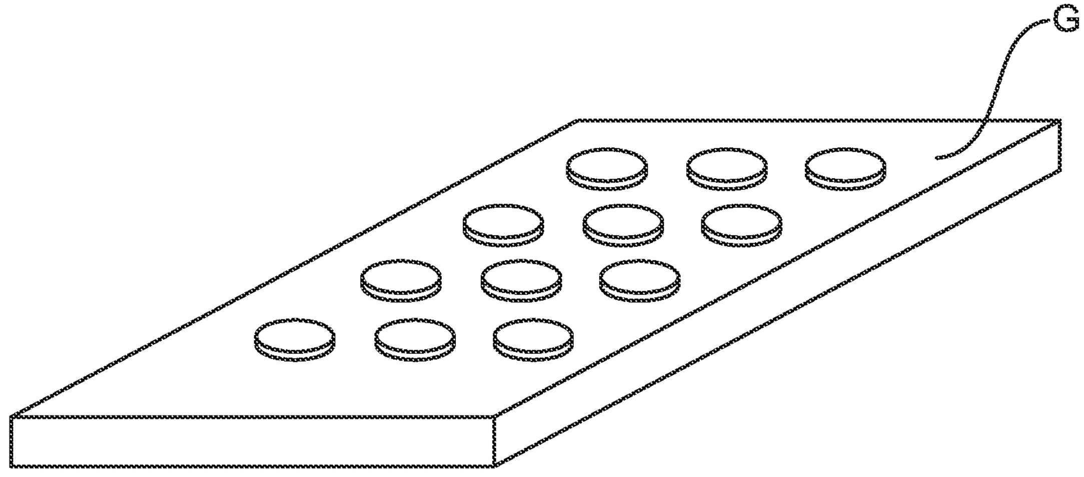
FIG. 1 is a top perspective view of a remote control for the Solar Panel Charging Block and Light Assembly in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a top perspective view of a remote control for the Solar Panel Charging Block and Light Assembly in accordance with an embodiment of the present disclosure. The remote control G provides a wireless and remote access to the disclosure.

Figure 2:
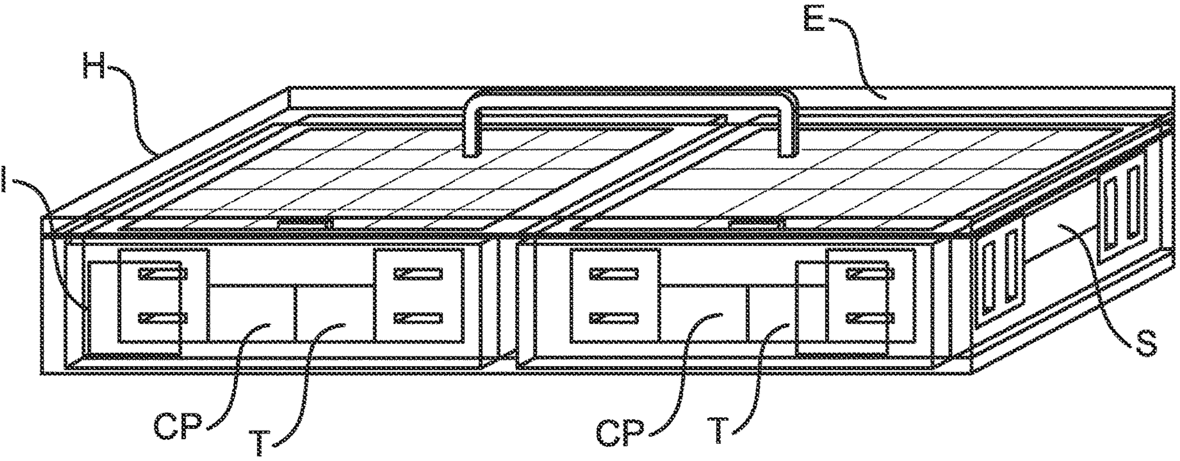
FIG. 2 is a top perspective view of the Solar Panel Charging Block and Light Assembly in accordance with an embodiment of the present disclosure.

FIG. 2 is a top perspective view of the Solar Panel Charging Block and Light Assembly showing: solar panel referenced as A, electric outlets referenced as B, USB ports referenced as C, click-on removable stake referenced as D, hinged clear and water proof cover E, removable and replaceable wire free battery F having contiguous electrical contacts, remote control referenced as G, carrying case of clear plastic H, cutout opening I in the case H, a charging indicator J, charge pump CP, transformer T and battery S in accordance with an embodiment of the present disclosure. The design includes an easy hang spot on the bottom. under the spike after its removed or next to it, that way it can hang on a single screw or nail with a head in a shed or closet for easy access.

Figure 3:
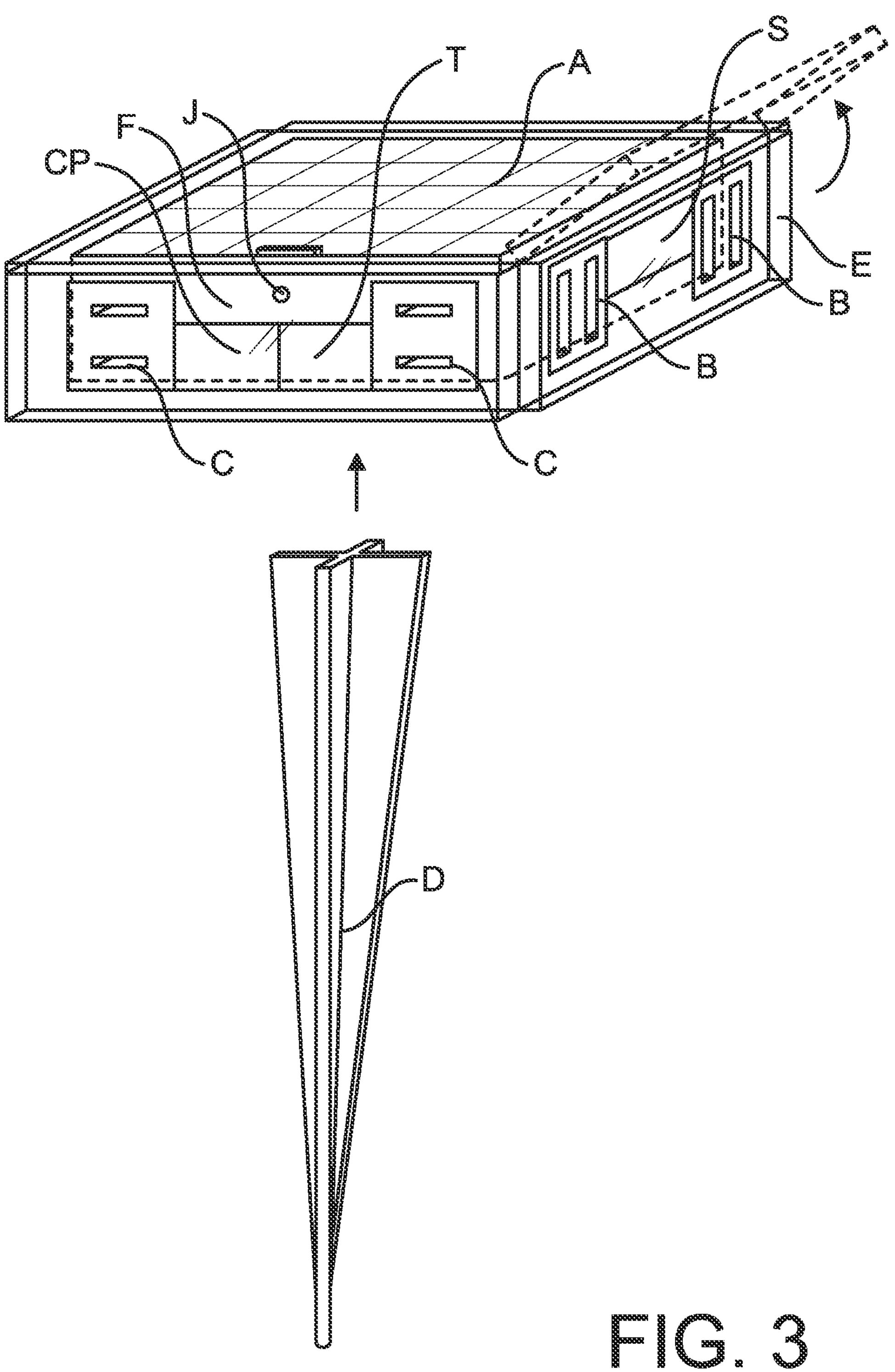
FIG. 3 is a top perspective view of the tandem Solar Panel Charging Block and Light Assembly in accordance with an embodiment of the present disclosure.

FIG. 3 is a top perspective view of the tandem Solar Panel Charging Block and Light Assembly showing: tandem or double solar panel referenced as A, electric outlets referenced as B, USB ports referenced as C, click-on removable stake referenced as D, tandem hinged clear and water proof cover E, removable and replaceable wire free battery F having contiguous electrical contacts, remote control referenced as G, carrying case of clear plastic H, cutout opening I in the case H, a charging indicator J, charge pump CP, transformer T and battery S in accordance with an embodiment of the present disclosure.

The present disclosed Solar Panel Charging Block and Light Assembly, also known as "Little Solar Sun", offers a modern accessory that allows users to effortlessly unplug the solar charging unit from associated string lights or other electric loads, thus eliminating the need for complex setup or disruption to outdoor décor. Expanding on the initial design of an average solar panel, the Little Solar Sun introduces a novel option that employs a cutting-edge home port, a compact unit that harnesses solar energy from the sun to charge itself, providing a sustainable and eco-friendly power source. For added convenience, the home port is also USB chargeable in a hybrid or in a sole source mode, allowing for alternative charging and hybrid charging methods.

The home port features multiple output plugs, enabling it to service several lights simultaneously. Due to this efficient and practical design, users can effortlessly illuminate various areas of their outdoor space without the hassle of multiple charging units. To further enhance functionality, the home port can be conveniently operated by a remote control. This remote control permits users to activate different sets of lights with the press of a button. Whereas each button corresponds to a specific set of lights, granting users effortless control over their illuminated environment. All components of the system are built to withstand water exposure, ensuring reliable performance in various weather conditions. This innovative, top-quality product ensures lights are properly charged at all times. Users will be able to enjoy extended illumination throughout the night, while eliminating the need for annual replacements of solar lights.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A Solar Panel Assembly comprising:

a charge pump configured to boost a solar cell voltage to an intermediate voltage;

a transformer configured to transform an alternating current voltage to the intermediate voltage;

a battery configured to take a charge at the intermediate voltage from the charge pump and the transformer simultaneously; and a transparent housing for the charge pump, the transformer and the battery.

2. The Solar Panel Assembly of claim 1, further comprising a plurality of AC charging ports in electrical communication with the transformer.

3. The solar panel assembly of claim 1, wherein the intermediate voltage is a universal serial bus (USB) voltage.

4. The solar panel assembly of claim 1, further comprising a plurality of USB charging ports in electrical communication with the battery.

5. The solar panel assembly of claim 1, further comprising a stake configured to support the transparent housing and stick in an earthen surface.

6. The solar panel assembly of claim 5, wherein the stake provides an electrical ground source for the intermediate voltage.

7. The solar panel assembly of claim 5, further comprising a hinge on the stake and the transparent housing configured to tilt a relation thereof.

8. The solar panel assembly of claim 1, further comprising a remote control configured to monitor and control the solar panel assembly.

9. The solar panel assembly of claim 1, wherein the transparent housing comprises a plexiglass construction.

10. The solar panel assembly of claim 1, wherein the transparent housing comprises a glass construction.

11. The solar panel assembly of claim 1, further comprising a square array of solar cells housed within the transparent housing.

12. The solar panel assembly of claim 1, further comprising a concatenation of square arrays of solar cells housed within the transparent housing.

13. The solar panel assembly of claim 1, further comprising a plurality of solar cells connected in series across the charge pump.

14. The solar panel assembly of claim 1, further comprising a plurality of solar cells connected in series across a series of capacitors in the charge pump.

15. The solar panel assembly of claim 1, further comprising a plurality of solar cells connected in parallel across the charge pump.

16. The solar panel assembly of claim 1, further comprising a plurality of solar cells connected in parallel across a series of capacitors in the charge pump.

* * * * *